F. W. SHILLITTO.
TOOL HOLDER.
APPLICATION FILED MAR. 12, 1910.

978,226.

Patented Dec. 13, 1910.

WITNESSES:
Florence H. Monk.
Samuel A. Gardner.

INVENTOR
Frank W. Shillitto.
BY George Stagg
ATTORNEY

UNITED STATES PATENT OFFICE.

FRANK W. SHILLITTO, OF NEW HAVEN, CONNECTICUT, ASSIGNOR TO THE READY TOOL COMPANY, OF NEW HAVEN, CONNECTICUT, A CORPORATION OF CONNECTICUT.

TOOL-HOLDER.

978,226.     Specification of Letters Patent.     Patented Dec. 13, 1910.

Application filed March 12, 1910. Serial No. 548,893.

*To all whom it may concern:*

Be it known that I, FRANK W. SHILLITTO, a citizen of the United States, residing at New Haven, in the county of New Haven and State of Connecticut, have invented certain new and useful Improvements in Tool-Holders, of which the following is a specification, reference being had therein to the accompanying drawings.

My invention relates to new and useful improvement in tool holders, having for its object, among other things, to provide a device of this character with means whereby the cutter will be securely held in its adjusted positions, with a uniform pressure throughout its contact length, by mechanism that is economical to construct and readily assembled.

To these, and other ends, my invention consists in the tool holder, having certain details of construction and combinations of parts, as will be hereinafter described and more particularly pointed out in the claims.

Figure 1:
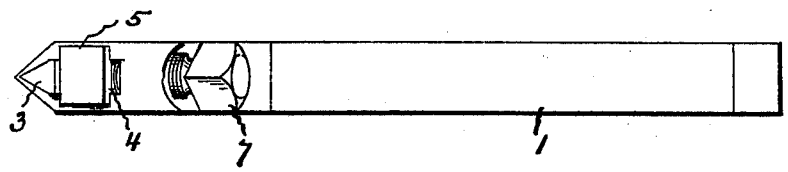
Figure 2:
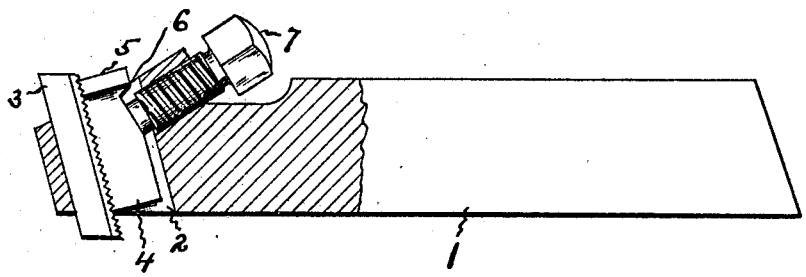
Figure 3:
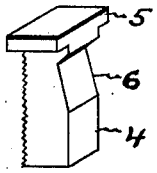

Referring to the drawings, in which like numerals of reference designate like parts in the several figures; Figure 1 is a plan view of my new and improved tool holder; Fig. 2 is a side elevation thereof partly in section; and Fig. 3 is an isometric view of the dog.

Referring to the drawings, the numeral 1 designates the body member, near the front end of which is the opening 2, containing the cutter 3, shown in the drawings as a thread tool, the front end of the opening 2 and the cutter 3, being substantially the same in cross section. Also mounted in the opening 2 is the dog 4 having a head 5 thereon which rests upon the top of the body member 1, and having a notch 6 in its rear face for the reception of the point of the screw 7, which is threaded through the body member 1. The contacting faces of the cutter 3 and dog 4 are each provided with transverse teeth of uniform size, which mesh into each other, as shown in Fig. 2, which prevents the cutter 3 from dropping through the holder, the dog being held by the head 5 thereof. It is apparent that by tightening or loosening the screw 7 the dog 4 will either hold or release the cutter 3, the contact of the point of the screw 7 with the dog 4 being substantially midway of the length thereof and thereby imparting a uniform pressure of the dog upon the cutter 3, and the cutter 3 against the front of the opening 2.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a device of the character described, the combination with the body member, having an opening therethrough substantially parallel with the sides thereof and at an angle to the bottom of said body member inclined rearwardly; a cutter within said opening having a notched face; a dog having a notched face, and a head wider than the shank portion designed to rest upon the top of said body member when said shank is within said opening; and a screw threaded through said body member, the point thereof impinging against the back of said dog.

2. In a device of the character described, the combination with the body member, having an opening therethrough substantially parallel with the sides thereof and at an angle to the bottom of said body member inclined rearwardly; a cutter within said opening having a notched face; a dog having a shank portion and a head portion, said shank portion having a notched face and of substantially the same width as said opening and said head portion wider than said shank portion; and a screw threaded through said body member, the point thereof impinging against the face of the shank portion of said dog opposite said notched face.

3. In a device of the character described, the combination with the body member, having a cutter opening therethrough; a cutter within said opening having a notched face; a dog having a notched face, and a head wider than the shank portion, designed to support said dog when said shank is within said opening; and a screw threaded through said body member, the point thereof impinging against the back of said dog.

In testimony whereof I affix my signature in presence of two witnesses.

FRANK W. SHILLITTO.

Witnesses:
    GEORGE E. HALL,
    FLORENCE H. MONK.